Feb. 8, 1944.   G. J. POLIVKA   2,341,414
FILTER
Filed Oct. 17, 1940
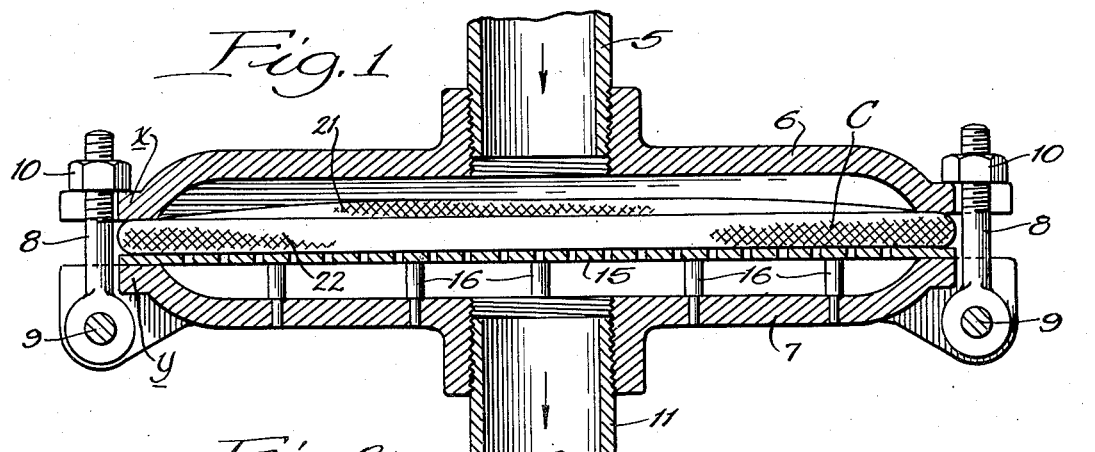
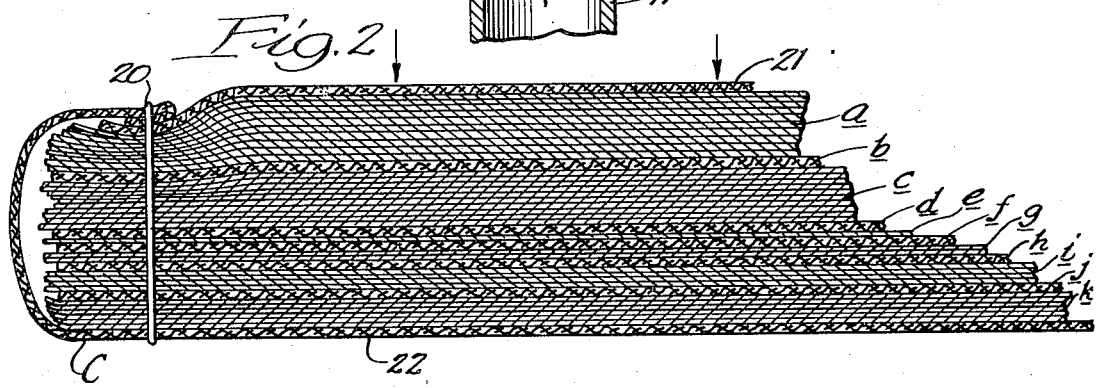
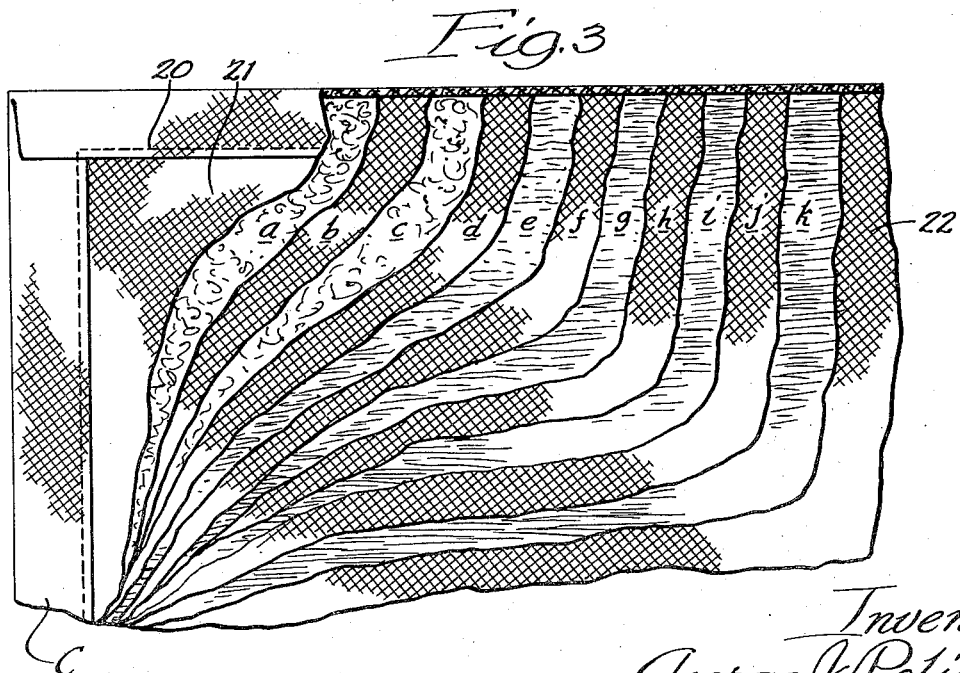
Inventor:
George J. Polivka,
By Bemming & Bemming
Attorneys Patented Feb. 8, 1944

2,341,414

UNITED STATES PATENT OFFICE 2,341,414

FILTER

George J. Polivka, La Grange, Ill.

Application October 17, 1940, Serial No. 361,552

6 Claims. (Cl. 210—185)

My invention which relates generally to filters is concerned more particularly with filters adaptable for the separation of very fine particles from a liquid body, such, for example, as the separation of leucocyte films and fine sediment from homogenized milk.

Milk for home consumption is improved by homogenization one of whose effects is an increase in the viscosity of the milk. When possible, milk or cream which has been so treated is passed through a clarifier which by centrifugal form throws the visible leucocyte film and fine sediment outwardly, thus separating it from the milk or cream. By thus expelling such substances, which are of a gray color, a milk or cream having a white or pure appearance is generally obtained. However, this clarifier process which is too expensive for the average dairy is used mostly where a large volume of milk or cream is involved. Although an inexpensive filter which will easily rid homogenized milk of this undesirable substance has long been sought, no such filter has been found which will leave the product substantially free and clear of leucocyte and precipitated content, its presence becoming visible as a gray sediment after the milk or cream has stood for twenty hours or more. This factor at once suggests impurity in the milk and has a bad effect upon customers.

To meet these conditions I have devised a filter having an assembly of elements in the form of a cartridge which will trap the leucocyte film and other fine sediment to an extent not obtainable with the finest filter cloth, and to a degree that only such leucocyte films will remain as are too fine to be visible. A further object of the invention is to provide an assembly of filtering elements which are simple and inexpensive whereby the cartridges may be discarded and replaced at nominal cost. Another object of the invention is to provide replaceable filtering cartrigdes each containing a plurality of elements that are individually absorbent and which occur in groups of increasing density, whereby to make the filtering of the treated medium gradual.

With the above objects in view and others which will suggest themselves in the description to follow, a clear understanding of my invention may be gained by reference to the accompanying drawing, wherein—

Figure 1 is a vertical section through the present apparatus in its entirety;

Fig. 2 is a fragmentary transverse section through the filter cartridge on an enlarged scale; and Fig. 3 is a partial plan view of the cartridge broken away at various places to show successive filter elements contained therein.

Referring particularly to Fig. 1, an inlet pipe 5 is provided to carry the milk or other fluid into the filter which, as shown, comprises a pair of plates 6 and 7 having interengaging inset clamping edges $x$ and $y$, respectively. These plates are adjustably secured as by bolts 8 each pivoted to one plate at 9 and carrying a nut 10 which is adapted to engage the other plate. The inlet pipe which connects with one plate is in communication with its inner side, an outlet pipe 11 being similarly connected to the other plate.

With a pair of such filter plates, which are common at the present time, I associate a perforated disk 15 adapted to rest against the inset edges of the outlet plate 7 and upon a plurality of spaced supporting posts 16 each having one end anchored in the plate 7. A filter cartridge C is also rested against the disk side which is opposite the posts, being secured in position by the clamping action of the plate edges $x$ and $y$ which engage with the margins of the cartridge, all as appears clearly in Fig. 1. The liquid entering in the filter through the inlet pipe is accordingly required to pass through the cartridge where it is relieved of its solid particles before emerging through the outlet pipe.

The filter cartridge which is of special construction is the feature of principal importance to my invention. In its make-up, it comprises a plurality of sheets, arranged in a certain order, and all united near their edges as by stitching 20 which passes through opposite sides 21 and 22 of an enclosing envelope which is desirably made of filtering cloth which serves as a grid. The individual elements in the order in which they are contained within the envelope, from its inlet to its outlet sides, may be:

(a) Crepe paper—about 10 thin porous layers.
(b) Filtering cloth.
(c) Crepe paper—about 10 thin porous layers.
(d) Filtering cloth.
(e) Dense absorbent paper, similar to a napkin paper.
(f) Filtering cloth.
(g) Dense absorbent paper—two layers.
(h) Filtering cloth.
(i) Dense absorbent paper—four layers.
(j) Filtering cloth.
(k) Dense absorbent paper—six layers.

The series of filter elements so combined may continue with the filtering cloth in single sheets alternating with progressively increasing groups of dense absorbent paper sheets. Such an assembly of elements is rated as of a certain density and duration; and the series may be increased where the ultimate density of the filter is to be greater, as where the treated fluid is differently constituted or the filtering requirements are more exacting.

The perforated disk acts to support the cartridge so that it may withstand the high pressure of the fluid under treatment. The disk is sufficiently strong to prevent the cartridge from warping or buckling in response to the fluid pressure that is encountered, while preserving through the perforations free passage for the liquid.

While it is not new to assemble in a filter a plurality of filtering cloths with alternate layers of paper, in the present filter I have selected and arranged cloth and paper elements having certain unusual characteristics and behavior when combined in the manner specified.

The thin crepe paper of which a number of layers are interposed in the cells between the first and second, and the second and third filtering cloths, are relatively porous. They also have an affinity, in some degree at least, for leucocyte particles which tend to adhere to such paper instead of passing on to collect on the filter cloths. By arranging in a single cell a number of layers in adjacent relation the permeability of the entire group is considerably reduced; but the crinkles resulting from the creping, afford, in effect, lateral passages by which the liquid under treatment may circulate somewhat between the layers in passing from the pores of one into and through the pores of the next. The presence of these layers of crepe paper in a zone at the inlet side of the filter cartridge acts to relieve the treated liquid of its grosser sedimentary particles, and the passage of liquid therethrough may be referred to as the primary phase of the filtering operation.

A secondary phase follows when the liquid passes into the zone occupied by the several cells each containing one or more layers of relatively dense absorbent paper which also possess an affinity for leucocyte particles. Each cell is defined by two adjacent, but spaced, filtering cloths, and it is occupied by one or more layers of the dense absorbent paper. In this phase of the filtering treatment the liquid is relieved progressively of its finer sedimentary particles. By reason of the dense character and relatively smooth surfaces of the absorbent paper which occupies each of these cells there is little or no opportunity for the liquid to circulate laterally. It can only advance transversely through the filtering elements toward the outlet side of the cartridge. Between each cell, however, it is possible for the liquid to travel slightly in a lateral direction through the meshes or interstices of the filtering cloth. The presence of these cloth sheets acts, therefore, to break up and deflect the direction of the flow of the liquid under treatment so that upon entering each succeeding cell it tends to advance in a direction which is slightly offset or diverging from that in which it was last proceeding. The greater number of the dense absorbent sheets which occupy the cells near and at the outlet side of the cartridge assures that finer sedimentary particles which may have traveled that far will be separated from the liquid whereby the fluid upon emerging from the filter will be relieved entirely, or substantially so, of all such particles. In the case of homogenized milk for example, the present filter has demonstrated its effectiveness to the extent that it will serve to remove the objectionable leucocytes to the point that their presence, if any at all remain, is wholly inconsequential.

I have accordingly utilized the porous and foraminous texture of the filtering cloth as a beneficial spacing means between the different groups of absorbent paper sheets. Each filtering cloth also acts as a supporting grid for the elements which it engages. The liquid thus has an opportunity to flow and move between the absorbent paper groups by its relatively freer passage through the intermediary filtering cloth layer, so that the increasing resistance is applied gradually or in steps, permitting the fluid to be divested of the objectionable particles without difficulty. Also the meshes of the intermediary cloth plies allow room for the movement of the passing medium, preventing the formation of deposits which would otherwise soon clog the cartridge. By using two different textures of paper in the filter cartridge I provide for both primary and secondary phases in the filter operation whereby particles of different size and also of different kind as well, are separated out from the treated liquid.

It will be evident from this description that I have provided a filter cartridge which will effectively set up progressive resistance to leucocyte particles which constitute an undesirable factor in homogenized milk or cream, allowing the liquid freedom of motion at every step. Moreover, the provision of zones, each containing thin porous layers of crepe paper or dense absorbent paper, and so arranging these zones as to establish primary and secondary phases for the filtering operation, produces results more satisfactory than any previous grouping and packing of filtering cloths or fabrics with which I am familiar. Further, each cartridge is flat and compact in form, convenient for insertion and removal in a filter frame; also its component elements are inexpensive and easily assembled whereby the cartridges may be produced at small cost.

The present invention was in large part disclosed in my application filed November 7, 1939, under Serial No. 303,328, of which this case is a continuation in part.

A specimen filter cartridge embodying the improvements of this invention is filed herewith, being marked Exhibit A.

I claim:

1. In a filter, a cartridge comprising a plurality of filtering elements arranged in substantially flat, parallel, adjacent relation, the elements in the inlet side of the filter comprising spaced sets of thin, porous crepe paper, the elements adjacent the outlet side of the filter and certain of the intermediate elements between the inlet and outlet sides of the filter being made of textile material and the cells between adjacent sheets of the textile material being filled with paper sheets, the thin and creped sheets subjecting liquid passing through the filter to a lateral circulation at spaced points of flow and those sheets toward the outlet side of the filter being dense and smooth and of progressively increasing number whereby liquid under treatment proceeds through a primary phase while passing through said creped paper sheets and through a secondary phase while passing through said smooth, dense sheets.

2. The process of filtering out fine solid particles from a liquid which consists in forcing the liquid into a filtering cartridge under pressure, circulating the liquid first laterally at spaced points of flow through separate sheets of thin, porous paper elements which are creped and then passing the liquid through a succession of dense absorbent paper sheets which are smooth, thereby subjecting the liquid first to a primary phase of treatment in which it is free to circulate laterally horizontally at spaced points of flow through the crinkled passages of the creped sheets and then through a secondary phase of treatment in which the liquid is substantially prevented from circulating laterally while passing through the filtering elements therein.

3. The process of filtering out fine solid particles from a liquid which consists in forcing the liquid through a filtering cartridge, circulating the liquid first through a plurality of thin, porous paper elements which are creped and separated by a reinforcing grid and of then passing the liquid through a succession of progressively increasing number of smooth dense absorbent paper sheets which are separated by reinforcing grids, thereby subjecting the liquid first to a primary phase of treatment in which it is free to circulate laterally through the crinkled passages of the creped sheets and then through a secondary phase of treatment in which the liquid is sustantially prevented from circulating laterally while passing through the filtering elements therein.

4. In a filter, a cartridge comprising a plurality of filtering cloths and between the filtering cloths a plurality of paper sheets, those toward the inlet side of the filter comprising spaced sets of thin, porous creped material, and those toward the outlet side of the filter being dense, absorbent and smooth, and means marginally interconnecting all the filter elements within the outermost filtering cloths which serve as an envelope therefor, the filter elements being elsewhere free and disconnected.

5. A filter unit comprising single layers of textile material arranged in alternation with plural layers of thin flat porous crepe paper at the inlet side of said unit, and single layers of textile material arranged in alternation with plural layers of dense absorbent paper at the outlet side of the unit, said plural layers progressing in number in each instance at each occurrence after the first layer.

6. In a filter, a cartridge comprising a set of thin, porous sheets of crepe papers arranged in vertical, superimposed, flat, close together relation, a second set of thin, porous sheets of crepe paper arranged in vertical, superimposed, flat, close together relation, a filtering cloth interposed between said two sets of sheets of crepe paper and in surface contact therewith, a layer of flat filtering cloth having surface contact with the lowermost sheet of said second set of crepe paper sheets, and other layers of textile material arranged in alternation with plural layers of flat, dense, absorbent layers of paper progressing in number in each instance at each occurrence to the lower face of the cartridge, and means marginally interconnecting all of the said filter elements together and enveloping the same.

GEORGE J. POLIVKA.